United States Patent
Cheung et al.

(10) Patent No.: US 9,986,873 B2
(45) Date of Patent: Jun. 5, 2018

(54) KITCHEN DEVICE WITH SUCTION FOOT

(71) Applicant: KONINKLIJKE PHILIPS N.V., Eindhoven (NL)

(72) Inventors: Sau Kan Cheung, Eindhoven (NL); Bengt Ivar Anders Ivarsson, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days. days.

(21) Appl. No.: 15/022,591

(22) PCT Filed: Dec. 12, 2014

(86) PCT No.: PCT/EP2014/077591
§ 371 (c)(1),
(2) Date: Mar. 17, 2016

(87) PCT Pub. No.: WO2015/097003
PCT Pub. Date: Jul. 2, 2015

(65) Prior Publication Data
US 2016/0345781 A1 Dec. 1, 2016

(30) Foreign Application Priority Data

Dec. 24, 2013 (WO) ................. PCT/CN2013/090341
Jan. 28, 2014 (EP) .................................... 14152759

(51) Int. Cl.
*A47J 45/02* (2006.01)
*F16B 47/00* (2006.01)

(52) U.S. Cl.
CPC ............... *A47J 45/02* (2013.01); *F16B 47/00* (2013.01)

(58) Field of Classification Search
CPC ......... A47J 45/00; A47J 45/02; B25B 11/005; A47K 3/12; A47K 3/122; A47K 3/125;
(Continued)

(56) References Cited

U.S. PATENT DOCUMENTS 2,147,907 A * 2/1939 MacChesney ..... A63B 37/0001
248/363
2,212,755 A * 8/1940 Solomon ............... B66C 1/0212
294/187
(Continued)

FOREIGN PATENT DOCUMENTS

DE 10359544 A1 7/2005
DE 202010008112 U1 11/2010
(Continued)

OTHER PUBLICATIONS

Espacenet, Machine Translation of Okita et al. (JP 8196454), Last Accessed Apr. 28, 2017, https://worldwide.espacenet.com/publicationDetails/biblio?DB=EPODOC&II=0&ND=3 &adjacent=true&locale=en_EP&FT=D&date=19960806&CC=JP &NR=H08196454A&KC=A#.*

*Primary Examiner* — Jonathan Liu
*Assistant Examiner* — Guang H Guan (57) ABSTRACT

The invention relates to a kitchen device (100) comprising: —a grip (120) for manually holding the device, the grip defining a grip area (112), —a first suction foot (130) attached to the device (100) and arranged to secure the device (100) to a surface (150) by means of suction against the surface (150), —an actuator (110) connected to the first suction foot (130) and extending in the grip area (112), the actuator (110) being arranged to transfer an actuating force (111) acting on the actuator (110) into a releasing force (131) acting on the first suction foot (130) to release the first suction foot (130) from the surface (150). This device can be released from the surface with an improved ease of use, because holding the device and releasing the device from the surface effectively have become a single, intuitive manual action by the user.

6 Claims, 7 Drawing Sheets

(58) Field of Classification Search
CPC . A47K 3/127; A47C 9/00; F16B 47/00; F16B 47/006
USPC ....... 248/205.5–206.4, 683, 537, 390.3, 362, 248/363; 294/186, 187, 64.1
See application file for complete search history.

(56) References Cited

U.S. PATENT DOCUMENTS

| | | | | |
|---|---|---|---|---|
| 2,303,393 | A * | 12/1942 | Schmidt | B66C 1/0212 294/186 |
| 2,620,217 | A * | 12/1952 | Lenhart | B66C 1/0212 294/187 |
| 2,965,345 | A * | 12/1960 | Gundelfinger | A47J 45/00 248/122.1 |
| 3,082,988 | A | 3/1963 | Holden | |
| 3,913,964 | A * | 10/1975 | Lukeman | A62C 99/009 169/70 |
| 4,038,914 | A * | 8/1977 | Crespo | A47G 29/093 248/346.5 |
| 4,932,701 | A * | 6/1990 | Cornillier | B65G 49/061 294/187 |
| 5,328,434 | A * | 7/1994 | Carroll | A63B 23/0211 482/140 |
| 5,405,112 | A * | 4/1995 | Trethewey | F16B 47/00 248/205.8 |
| 5,454,540 | A | 10/1995 | McPherson | |
| 5,611,511 | A * | 3/1997 | Lee | F16B 47/00 248/205.5 |
| 5,715,876 | A * | 2/1998 | Burt | B63B 25/082 114/343 |
| 5,950,529 | A | 9/1999 | Molloy | |
| 6,488,321 | B1 * | 12/2002 | Huang | F16B 47/00 294/187 |
| 6,581,541 | B2 * | 6/2003 | Hollinger | A01K 5/0114 119/61.5 |
| 2004/0237803 | A1 | 12/2004 | Palese | |
| 2005/0151039 | A1 | 7/2005 | Hsu | |
| 2016/0345781 | A1 * | 12/2016 | Cheung | A47J 45/02 |

FOREIGN PATENT DOCUMENTS

| | | |
|---|---|---|
| DE | 202012102310 U1 | 9/2013 |
| GB | 993084 A | 5/1965 |
| JP | 8196454 A | 8/1996 |
| JP | 1052331 A | 2/1998 |
| JP | 1080368 A | 3/1998 |
| JP | 10337263 A | 12/1998 |
| JP | 2000041879 A | 2/2000 |
| JP | 2001231702 A | 8/2001 |
| JP | 3090102 U | 11/2002 |
| JP | 2003180539 A | 7/2003 |
| JP | 3096368 U | 9/2003 |
| JP | 2003319884 A | 11/2003 |
| JP | 2004321350 A | 11/2004 |
| JP | 2006105344 A | 4/2006 |

* cited by examiner

FIG. 7

KITCHEN DEVICE WITH SUCTION FOOT

This application is the U.S. National Phase application under 35 U.S.C. § 371 of International Application No. PCT/EP2014/077591, filed on Dec. 12, 2014, which claims the benefit of International Application No. 14152759.8 filed on Jan. 28, 2014 and International Application No. PCT/CN2013/090341 filed on Dec. 24, 2013. These applications are hereby incorporated by reference herein.

FIELD OF THE INVENTION

The invention relates to kitchen devices, in particular kitchen devices having a suction foot attached to the device for securing the device to a surface.

BACKGROUND OF THE INVENTION

To stabilize kitchen appliances on a flat surface, a known solution is to use a plurality of suction feet (also called suction cups) positioned below the appliances, so that when the appliance is put on a flat surface, such as a kitchen table, the suction effect of the suction feet prevents (or at least limits) any movement of the appliance on this surface. Such type of solution is for example illustrated in U.S. Pat. No. 5,950,529A1, which shows the use of suction cups along with a vegetable peeling device. However, such known solution to stabilize kitchen appliances on a flat surface has the major drawback that afterwards, when a user wants to move the appliance, for example after the user has finished using the appliance and wants to move it to a storage area, the appliance is hardly detachable from the surface, for the mere reason that the suction feet are still preventing the appliance from being moved. Thus, the only solution for the user is to pull the appliance very hard to force the suction feet to let loose. However, this solution is not convenient, may damage the suction feet or the appliance, and can present some dangers to users.

SUMMARY OF THE INVENTION

It is an object of the invention to provide a kitchen device comprising a suction foot arranged such that the suction foot can be easily released. This object is solved by the subject matter of the independent claims, wherein further embodiments are incorporated in the dependent claims.

To this end, there is proposed a kitchen device comprising:

a grip for manually holding the device, the grip defining a grip area, a first suction foot attached to the device and arranged to secure the device to a surface by means of suction against the surface, an actuator connected to the first suction foot and extending in the grip area, the actuator being arranged to transfer an actuating force acting on the actuator into a releasing force acting on the first suction foot to release the first suction foot from the surface.

The actuating force created by a user when holding the device is advantageously transferred into a releasing force at the suction foot via the actuator. With this arrangement, the user can easily pull the device from the surface. In other words, the invention allows the device with the suction foot to be released from the surface with improved ease of use, because holding the device and releasing the device from the surface effectively have become a single, intuitive manual action by the user.

In a preferred embodiment, the first suction foot is attached to a bottom of the device for securing the device to a surface, being a substantially horizontal surface.

This allows easy release of devices having at least one suction foot below the bottom part.

In a preferred embodiment, the first suction foot is attached to a side of the device for securing the device to the surface, being a substantially vertical surface.

This allows easy release of devices having at least one suction foot on a lateral side.

In a preferred embodiment, the actuator and the first suction foot are made of a single piece of the same material.

This allows easy manufacturing of this assembly.

In a preferred embodiment, the actuator has an elongated shape.

This allows a user to easily hold the actuator and exert an actuating force on the actuator.

In a preferred embodiment, the elongated shape is shaped like a strip, being flat in a direction perpendicular to the elongated shape.

This allows a user to easily hold the actuator and exert an actuating force on the actuator.

In a preferred embodiment, the device comprises a second suction foot attached to the device and arranged to secure the device to the surface by means of suction against the surface, wherein the actuator is arranged to transfer the actuating force into a second releasing force acting on the second suction foot to release the second suction foot from the surface.

This allows easy release of devices having two suction feet from a surface.

In a preferred embodiment, the actuator, the first suction foot, and the second suction foot are made of a single piece of the same material.

This allows easy manufacturing of this assembly.

In a preferred embodiment, at least one of the first suction foot, the second suction foot and the actuator is made at least partly of a flexible rubber-like material.

A suction foot made of flexible rubber-like material allows air to easily enter the air-exhausted area of the suction foot when the suction foot is slightly deformed by the releasing force, while the actuator made of flexible rubber-like material allows contacting the actuator with the user's hand in a firm, non-slippery manner.

In a preferred embodiment, the actuator is reinforced with a durable material for resisting the wear-and-tear caused by manually applying the actuating force to the actuator many times.

This allows long-term use of the actuator, without deformation or breakage of the actuator.

In a preferred embodiment, a first extremity of the actuator is connected to the periphery of the first suction foot, and a second extremity of the actuator is connected to the grip area.

This allows a compact implementation of the actuator in the grip, which is advantageous for small-size devices.

In a preferred embodiment, a first extremity of the actuator is connected to the periphery of the first suction foot, and a second extremity of the actuator is connected to the periphery of the second suction foot.

This allows two releasing forces to be exerted on the suction feet at the same time.

In a preferred embodiment, a middle part of the actuator is connected to a central part of the grip area.

This allows easy release of the suction feet by exerting two separate releasing forces on the suction feet. Attaching the actuator to the grip area provides a more stable integration of the actuator into the grip, because it prevents loose movement of the actuator in the grip. Moreover, such a configuration is more durable, avoiding continuous stress at a central part of the actuator.

The invention also relates to a method of releasing at least one suction foot of a kitchen device from a surface, the device comprising a grip for manually holding the device, the grip defining a grip area. The method comprises the steps of:
- connecting an actuator to the first suction foot,
- extending the actuator in the grip area,
- generating a manual force acting on the actuator to release the first suction foot from the surface.

These and other aspects of the present invention will be apparent from and elucidated with reference to the embodiments described hereinafter.

BRIEF DESCRIPTION OF THE DRAWINGS

These and other aspects of the invention will be apparent from and elucidated with reference to the embodiments described hereinafter. In the drawings.

It should be noted that items that have the same reference numbers in different figures have the same structural features and the same functions. Where the function and/or structure of such an item has been explained, there is no necessity for repeated explanation thereof in the detailed description.

DETAILED DESCRIPTION OF THE INVENTION

Figure 1:
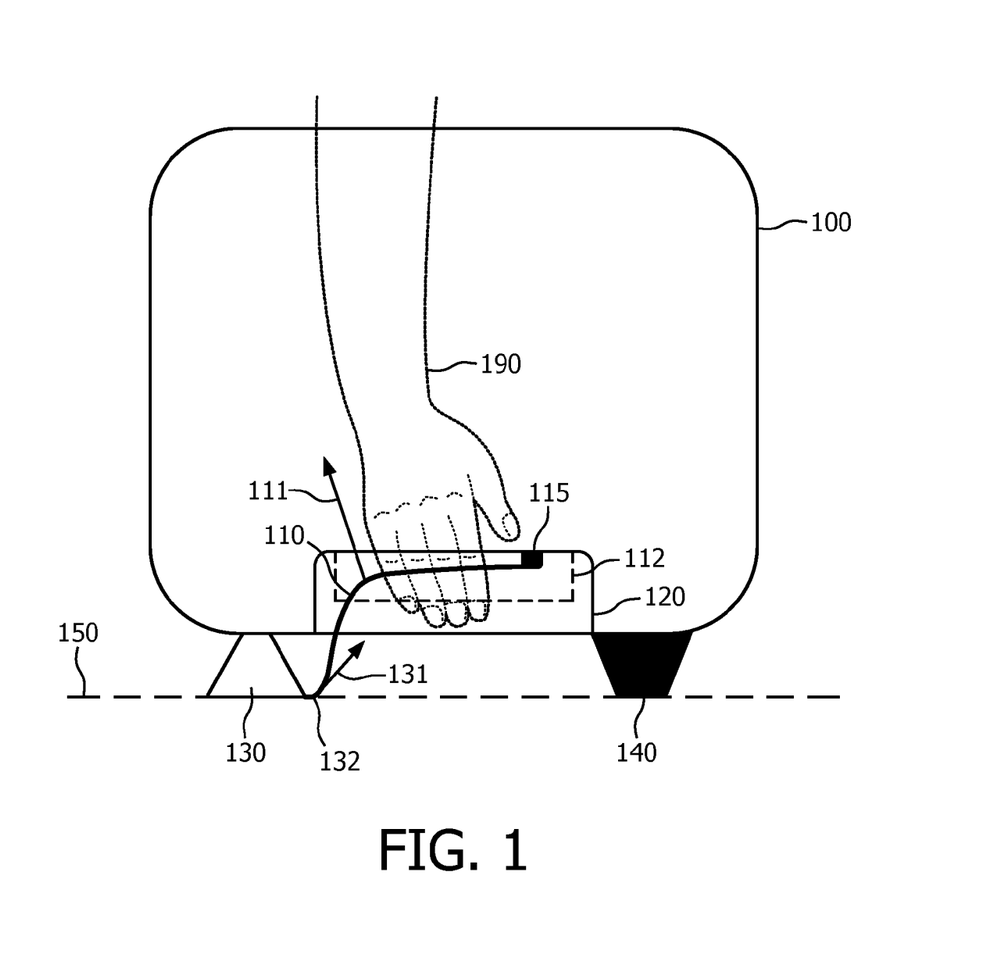
FIG. 1 illustrates a kitchen device according to the invention.

FIG. 1 illustrates a kitchen device 100 according to the invention. The kitchen device comprises a grip 120 for manually holding the device. The grip defines a grip area 112. The device 100 also comprises a first suction foot 130 attached to the device 100 and arranged to secure the device 100 to a surface 150 by means of suction against the surface 150. The device 100 also comprises an actuator 110 connected to the first suction foot 130 and extending in the grip area 112. The actuator 110 is arranged to transfer an actuating force 111 acting on the actuator 110 into a releasing force 131 acting on the first suction foot 130 to release the first suction foot 130 from the surface 150.

The device 100 is intended to rest on a surface 150 via a suction foot 130 and a supporting foot 140 that are both attached to the device 100. The device 100 is secured to the surface 150 by means of suction of the suction foot 130 against the surface 150, so that the device 100 cannot easily move or be moved on the surface 150, for example when preparing food ingredients or cooking food.

The grip 120 preferably forms a cavity that allows a user's hand 190 to hold the device 100 and move or lift the device 100.

A first extremity of the actuator 110 is connected to the periphery of the first suction foot 130, for example at connection point 132 as illustrated, and a second extremity of the actuator 110 is connected to the grip area 112, for example at connection point 115 as illustrated.

The actuator 110 extends in the grip 120, so that when a user manually holds the device 100 by the grip 120, the user at the same time wraps his finger(s), at the grip area 112, around the actuator 110 and applies a pressing force 111 against the actuator 110. Since the actuator 110 is structurally connected to the periphery of the suction foot 130, the pressing force 111 is transferred into a pulling force 131 that acts on the periphery of the suction foot 130. The pulling force 131 is directed away from the suction foot 130, so that air is allowed to enter under the suction foot 130 and the suction of the suction foot 130 against the surface 150 is reduced. The release of the suction foot 130 is thus initiated at the same time by manually holding the device 100 by the grip 120.

The term "at the same time" implies that the pressing of the actuator 110 occurs as a direct but implicit consequence of a user manually holding the device 100 by the grip 120. Considering the architecture of the kitchen device, the user does not necessarily consciously press the actuator 110, but pressing the actuator 110 is caused by the user holding the device 100 by the grip 120. When the user wants to move the device 100 to another place, the user therefore does not need to perform a separate manual action to release the suction foot, but initiating the release of the suction foot 130 has become an implicit part of manually holding the device 100. Consequently, when lifting the device 100, the user immediately benefits from the reduced suction of the suction foot 130 against the surface 150, facilitating lifting the device 100.

Note that the pressing force 111 represents an actuating force acting against the actuator 110 and that the pulling force 131 acts as a releasing force acting on the suction foot 130, thereby initiating the release of the suction foot 130.

The pulling force 131 acts on the suction foot 130 in a direction away from the suction foot 130 and preferably also away from the surface 150. Pulling up the suction foot 130 at the periphery of the suction foot 130 allows air to pass under the suction foot 130, causing suction to be reduced. The release of the suction foot 130 is thus initiated.

The pulling force 131 does not necessarily have to be directed upwards, away from the surface, in order to release the suction foot 130. It may be sufficient to release the suction foot 130 by directing the pulling force 131 away from the suction foot 130 in a direction parallel to the surface 150. As a suction foot 130 is made of a flexible material, the pulling force 131 in said parallel direction may be sufficient to deform the suction foot 130 and create openings at the periphery of the suction foot 130 to allow air to pass under the suction foot 130. For example, the suction foot 130 may be made of rubber-like material.

For example, the kitchen device may be a blender that the user wants to secure to a table to prevent the blender from moving over the kitchen table as a result of vibrations produced during blending, and which could result in the blender falling onto the floor or tipping over. Or, in the case of a blender having a substantial height dimension, the blender may tip over because of such vibrations. A suction foot attached to the bottom of the kitchen appliance is a useful means to secure the kitchen appliance in its position to the kitchen table in such a scenario. Securing of the kitchen appliance occurs as an immediate result of pressing down the kitchen appliance on the kitchen table, thanks to the suction action of the suction foot 130.

More generally, the device 100 may be any portable kitchen appliance that can be held and moved by a user and that can be secured to any flat surface 150 suitable for securing the device 100 via the suction foot 130, such as, for example, a kitchen table. At some point, the user may want to displace the kitchen machine because, for example, the user has finished preparing food ingredients or the user needs space on the kitchen table for other devices or other activities, or the user may want to store the machine in a cupboard. The user then holds the kitchen machine by the grip 120 and simply lifts it up, without having to perform any specific actions to dislodge (release) the kitchen machine from the kitchen table. This lifting action by the user results in releasing the suction of the suction foot 130. The device thus has a mechanism that not only enables the user to secure the kitchen machine easily by simply putting the kitchen machine down, but also to dislodge the kitchen machine easily by lifting the kitchen machine up.

Preferably, the actuator 110 has an elongated shape, such as, for example, a strip shape being flat in a direction perpendicular to the elongated shape.

Preferably, the actuator 110 is reinforced with a durable material to withstand the repetitive wear-and-tear caused by being pressed many times during the lifetime thereof. Such reinforcement, for example, is made of a tougher material than the rubber-like material, such as a firm plastic, metal, or wood. In a similar way, the top of the suction foot may be reinforced to protect the suction foot from abuse and wear-and-tear. The reinforcement of the suction foot 130 may be a plastic-like coating, preferably a material tougher and harder than the flexible material of the suction foot 130 itself.

Preferably, the actuator 110 and the first suction foot 130 are made of a flexible rubber-like material, typical for a suction foot.

Preferably, the actuator 110 and the first suction foot 130 are made of a single piece of the same material. For example, the actuator 110 and the first suction feet 130 may be made of an integral piece of rubber-like material. Or, at least part of the actuator 110 and part of the first suction foot 130 may be made of an integral piece of the same material, whereas the other parts of the actuator 110 and/or the first suction foot 130 may be made of another material.

Figure 2A:
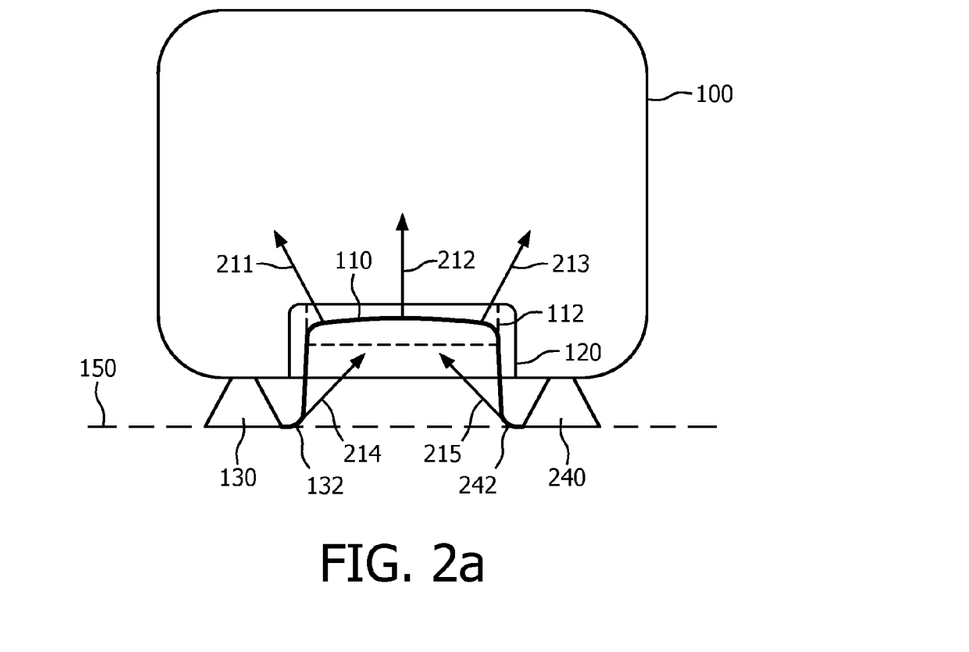
FIG. 2a illustrates another kitchen device according to the invention.

FIG. 2a illustrates another kitchen device 100 according to the invention, where the grip 120 and the actuator 110 are connected to two suction feet, a first suction foot 130 and a second suction foot 240. Compared to FIG. 1, the device 100 has two suction feet instead of one suction foot. The actuator 110 still extends in the grip area 112, but the actuator 110 is not connected to the grip 120. Instead, a first extremity of the actuator 110 is connected to the periphery of the first suction foot 130, for example at connection point 132 as illustrated, and a second extremity of the actuator 110 is connected to the periphery of the second suction foot 240, for example at connection point 242 as illustrated. Manually holding the actuator 110 causes the generation of pressing forces 211-212-213, which, in turn, cause pulling forces 214 and 215. Each pulling force 214 and 215 pulls on the respective suction foot 130 and 240 at its periphery in a direction away from the surface 150. Release of suction foot 130 and suction foot 240 is thus initiated upon manually holding the device 100 by the grip 120.

Preferably, the actuator 110, the first suction foot 130, and the second suction foot 240 are made of a flexible rubber-like material, typical for a suction foot.

Preferably, the actuator 110, the first suction foot 130, and the second suction foot 240 are made of a single piece of the same material. For example, the actuator 110, the first suction foot 130 and the second suction foot 240 may be made of an integral piece of rubber-like material. Or, at least part of the actuator 110 and part of the first suction foot 130 and second suction foot 240 may be made of an integral piece of the same material, whereas the other parts of the actuator 110 and/or the first suction foot 130 and second suction foot 240 may be made of another material.

Figure 2B:
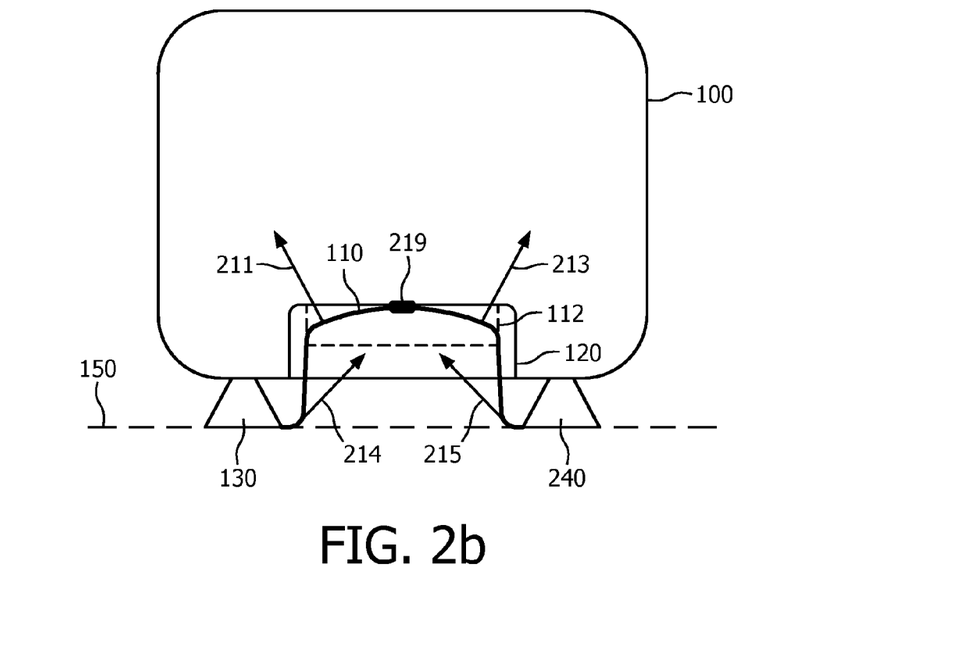
FIG. 2b illustrates another kitchen device according to the invention.

FIG. 2b illustrates another kitchen device 100 according to the invention, where the grip 120 and the actuator 110 are connected to the first suction foot 130 and the second suction foot 240, and the actuator is also connected and attached to the grip 120. Compared to FIG. 2a, a middle part of the actuator 110 is connected to a central part of the grip area 112, for example at a central connection point 219 as illustrated. For example, the connection point 219 is situated at the top of the cavity of the grip area 112. Manually holding the grip 120 causes pressing forces 211 and 213 to be generated in off-center positions at the top of the grip 120. Because the actuator 110 is attached to the grip 120, the actuator 110 cannot be pressed further against the grip 120 at the central connection point 219. However, by manually holding the actuator 110 by the grip 120, the user produces pressing forces 211 and 213, for example via two adjacent fingers, which, in turn, causes pulling forces 214 and 215.

Figure 3:
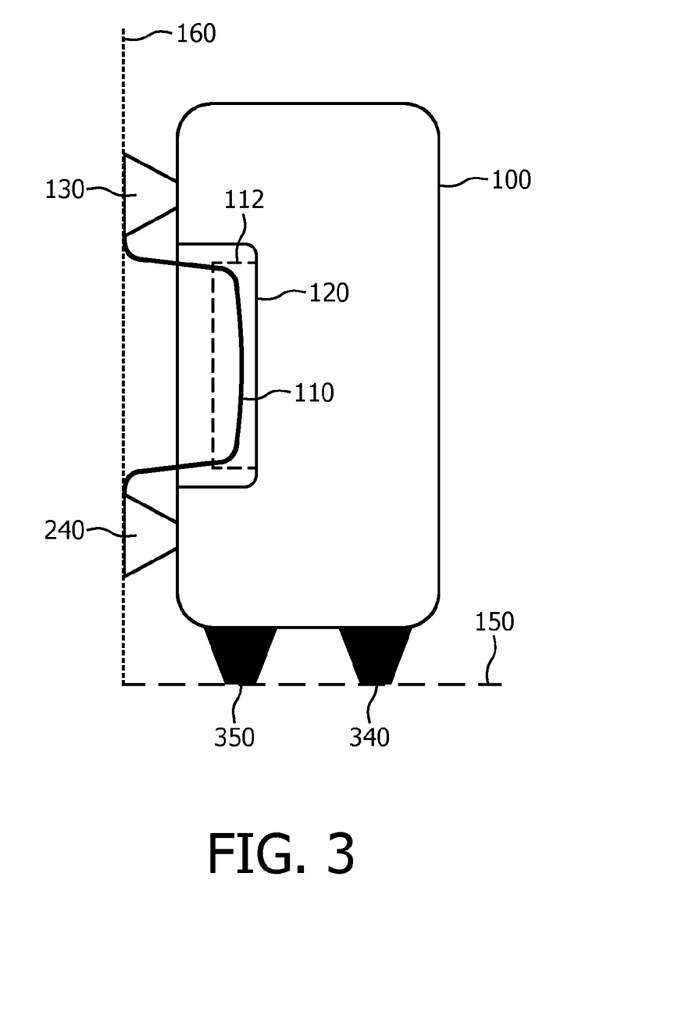
FIG. 3 illustrates another kitchen device according to the invention.

FIG. 3 illustrates another kitchen device 100 according to the invention. Instead of being secured to a horizontal surface, the device 100 is secured to a vertical surface 160, e.g. a wall. The actuator 110 is similar to that shown in FIG. 2a, but in a vertical orientation instead of a horizontal orientation. The device 100 also includes supporting feet 340 and 350 for resting on a horizontal supporting surface 150. The device 100 is thus arranged to be secured to a wall. For example, the device 100 is a kitchen appliance and the wall is a kitchen wall above the kitchen table. If the kitchen appliance is heavy, it may be advantageous to use the configuration of FIG. 3, because the suction feet may be more suitable to secure the kitchen appliance to the wall than to sustain the weight of the kitchen appliance on the kitchen table.

Figure 4A:
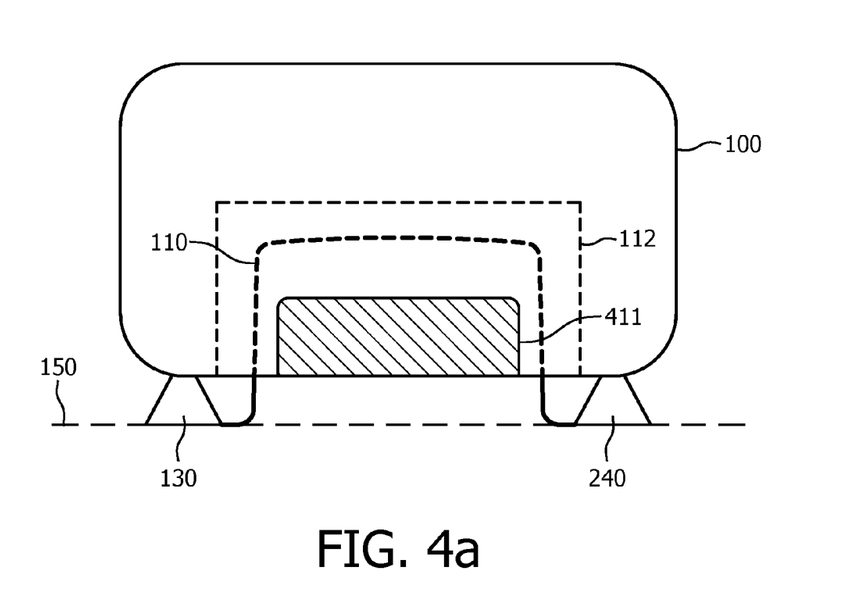
FIG. 4a and FIG. 4b illustrate another kitchen device according to the invention in two different status of use.

FIG. 4a illustrates another kitchen device 100 according to the invention, comprising a button 411 (or pushing element) extending inside the grip area 112, and an actuator 110 connected to the two suction feet 130 and 240. The button 411 preferably occupies at least part of a cavity in the grip area 112. The button 411 is arranged to slide vertically inside the grip area 112, for example by using a sliding mechanism on the lateral sides of button 441 (not shown). When the user manually holds the device 100 at the grip area 112, the user pushes the button 411 upwards into the interior against the actuator 110, causing a pressing force against the actuator 110.

Figure 4B:
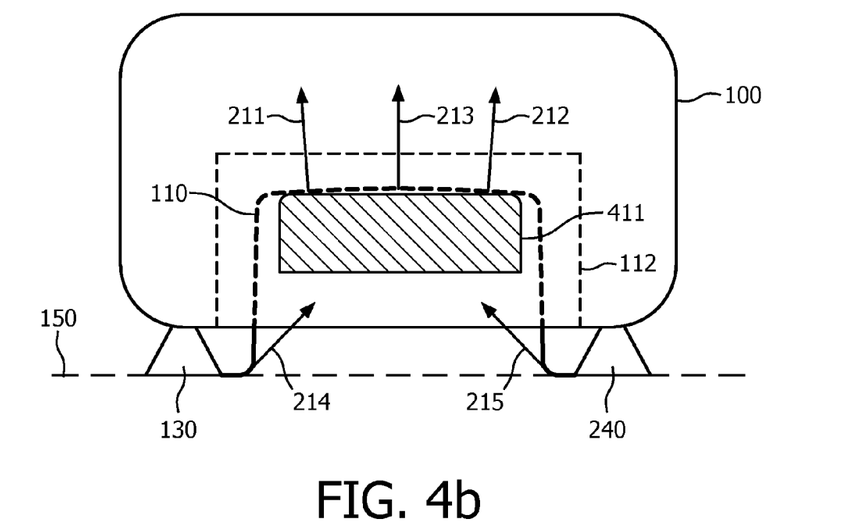

FIG. 4b illustrates forces acting on the device 100 of FIG. 4a when the device 100 is being manually held at the grip area 112. Pressing the button 411 upwards against the actuator 110 causes the generation of pressing forces 211-212-213. Consequently, pulling forces 214 and 215 are generated, pulling upward the peripheries of the first suction foot 130 and the second suction foot 240, respectively, and initiating the release of the suction foot 130 and the suction foot 240 from the surface 150. Positioning the actuator 110 inside the device in such a way is advantageous not only from an aesthetic point of view, but also practically in the sense that the actuator 110 cannot get entangled in other equipment.

Figure 5A:
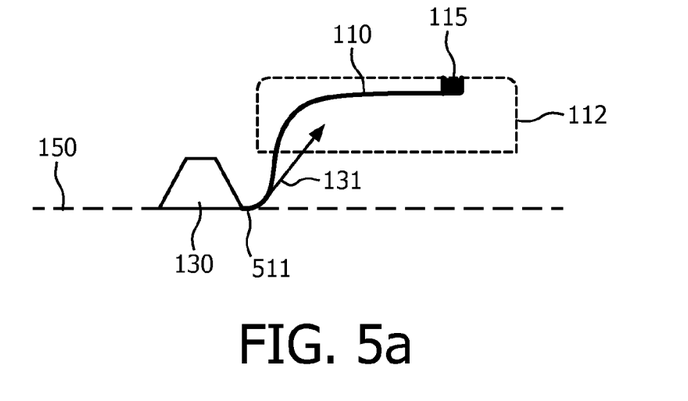
FIG. 5a, FIG. 5b, FIG. 5c illustrate different connections between a suction foot and an actuator according to the invention.
Figure 5B:
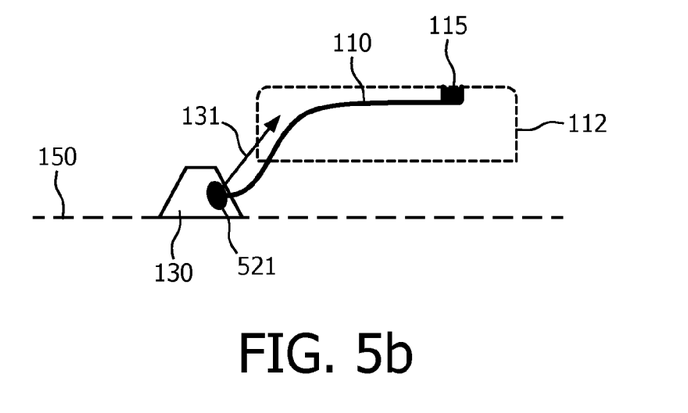
Figure 5C:
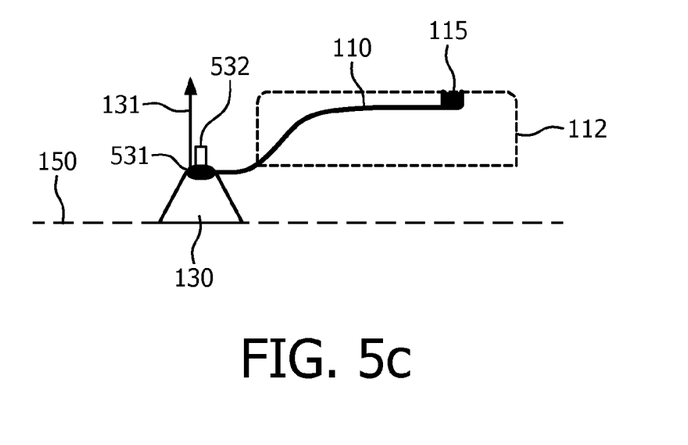

FIGS. 5a-5b-5c illustrate different types of connections between the suction foot 130 and the actuator 110, for example based on a device as described with reference to FIG. 1.

FIG. 5a illustrates an actuator 110 connected to the periphery of the suction foot 130 at a connection point 511, as also illustrated in the previous embodiments. The pulling force 131 acting on the periphery of suction foot 130 in a direction away from the suction foot 130 creates an opening under the suction foot 130 that allows air entering under it, thereby reducing the suction of the suction foot 130 to the surface 150 and initiating its release from the surface 150.

FIG. 5b illustrates an actuator 110 connected at a connection point 521 in the suction foot 130. The connection point 521 comprises a valve plug (not shown) that is plugged into a valve opening in the suction foot 130. By applying pulling force 131 to the valve plug, the valve is opened and air is permitted to flow inside/under the suction foot 130, so that the suction of the suction foot 130 is reduced. The valve plug is attached to the valve opening by means of connections of a flexible material, e.g. rubber, between the circumference of the valve plug and the valve opening. The flexible connections provide an inward pulling force that pulls the valve inward into the valve opening. When the pulling force 131 that acts on the exterior of the valve plug exceeds said inward pulling force, the valve plug is pulled out of the valve opening. Air is then permitted to flow via the valve opening under the suction foot and reduce the suction.

FIG. 5c illustrates an actuator 110 connected at a connection point 531 in the suction foot 130. The connection point 531 comprises a valve (not shown) at a center of the suction foot 130. The configuration of FIG. 5c is similar to that of FIG. 5b, with the difference that the valve opening is at the top of the suction foot 130. The suction foot 130 is for example connected to the device 100 by a tubular connection 532, and the valve opening and valve plug are inside said tubular connection. When there is no pulling force acting on the valve plug, the valve plug is pulled into the valve opening by an inward pulling force (as in the previous paragraph). When the pulling force 131 acts on the valve plug and exceeds the inward pulling force, the valve plug is pulled out of the valve plug. Air is then permitted to flow under the suction foot and reduce the suction.

Figure 6A:
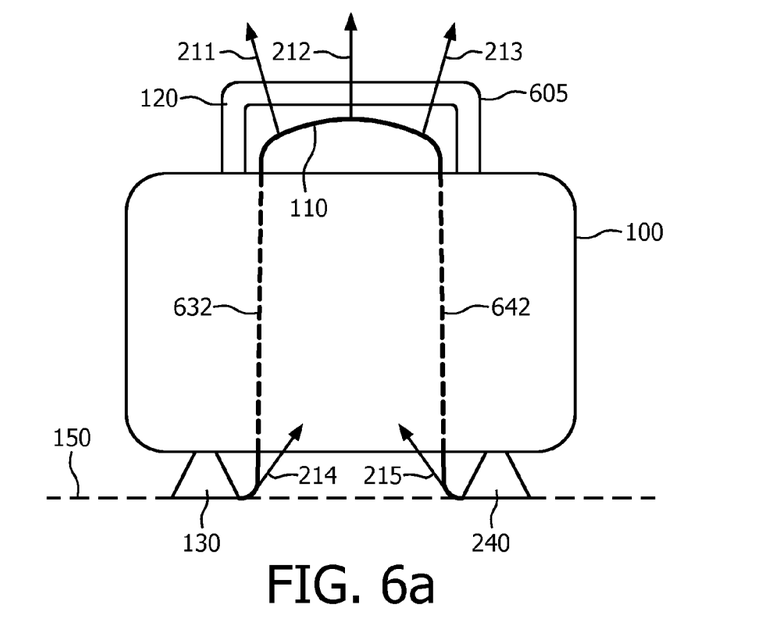
FIG. 6a illustrates another kitchen device according to the invention.

FIG. 6a illustrates another kitchen device 100 according to the invention, wherein the actuator 110 is integrated into the grip 120. The grip 120 forms a carrying handle 605. A difference with respect to other embodiments is that the grip 120 is configured as a separate handle extending outside the body of the device, instead of a cavity. The actuator 110 is illustrated as also partly (632, 642) extending through the interior of the device 100, similar to FIG. 4a. The actuator 110 follows the top of grip 120, i.e. the top of the inner part of the handle 605, similar to FIG. 2a. When the user puts the device 100 down on the flat surface 150, the device 100 will secure itself to the surface 150 via the first suction foot 130 and the second suction foot 240. When the user lifts up the device 100, he holds the device 100 by the grip 120 and generates the pressing forces 211-212-213 against the actuator 110 and consequently causes the pulling forces 214 and 215 acting on the suction feet 130 and 240. The suction exerted by the suction feet 130 and 240 is then reduced. The release of said suction feet is thereby initiated, making it easy to lift the device 100 from the surface 150.

Figure 6B:
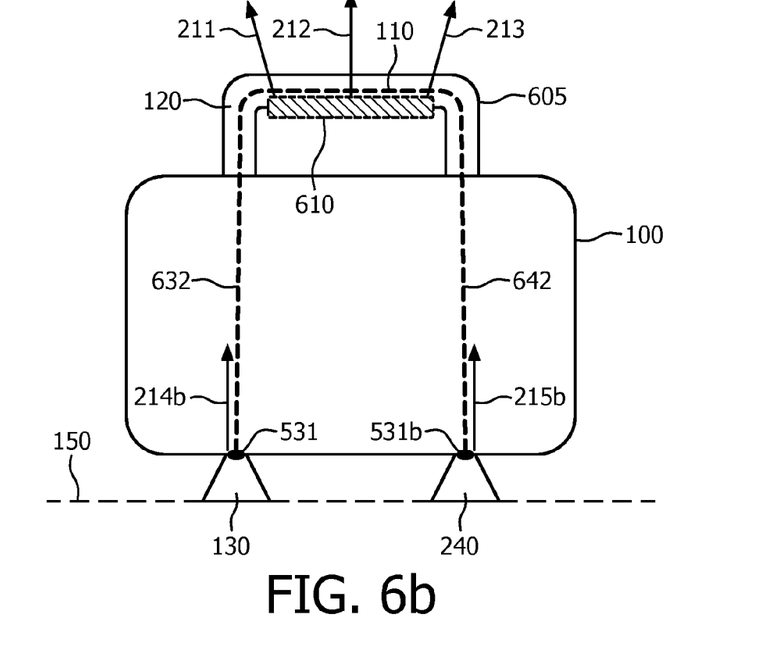
FIG. 6b illustrates another kitchen device according to the invention.

FIG. 6b illustrates another kitchen device 100 according to the invention, wherein the actuator 110 is integrated into the interior of the grip 120. The grip 120 forms a carrying handle 605. FIG. 6b shows a variant to the device of FIG. 6a in that the handle 605 has an additional button 610, similar to FIGS. 4a-4b. When the user lifts up the device 100, he presses the button 610 upwards, into the carrying handle 605, against the actuator 110, thereby generating the pressing forces 211-212-213, and consequently the pulling forces 214b and 215b that act on the respective valve plugs 531 and 531b, for example corresponding to valve plugs as described according to FIG. 5c. The release of the suction feet 130 and 240 is thus initiated, facilitating the user in lifting the suitcase-like device 100 from the floor 150.

Figure 7:
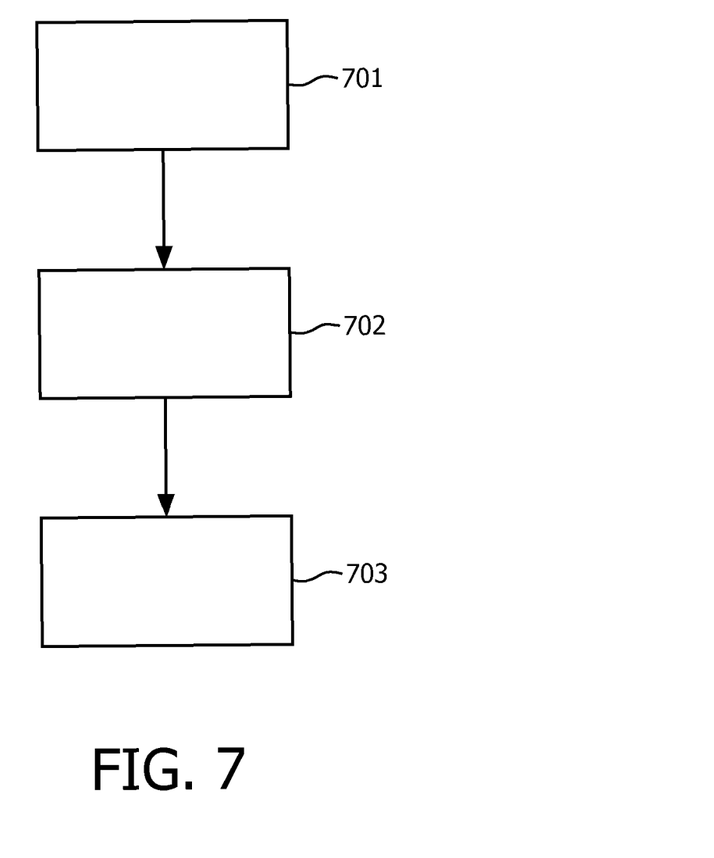
FIG. 7 depicts a flow chart of a method of releasing at least one suction foot of a kitchen device according to the invention.

The invention also relates to a method of releasing at least one suction foot of a kitchen device from a surface, the device comprising a grip for manually holding the device, the grip defining a grip area. The device corresponds to a device according to the invention as previously described. A flowchart of this method is depicted in FIG. 7. The method comprising the steps of:

connecting (701) an actuator to the first suction foot,
extending (702) the actuator in the grip area,
generating (703) a manual force acting on the actuator to release the first suction foot from the surface.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A kitchen device comprising:
   a main body having an upper portion, a lower portion, a first lateral side, and a second lateral side, the lower portion of the main body including a top side, a first substantially vertical side, and a second substantially vertical side, the first substantially vertical side being arranged between the first lateral side and the second lateral side, the second substantially vertical side being arranged between the first lateral side and the second lateral side;
   a suction foot attached to the lower portion of the main body and configured to secure the kitchen device to a surface by means of suction against the surface, a majority of the suction foot being arranged between the first lateral side and the first substantially vertical side;
   a supporting foot attached to the lower portion of the main body and configured to support the kitchen device, a majority of the supporting foot being arranged between the second lateral side and the second substantially vertical side;
   a cavity formed in the lower portion of the main body and defined by the top side, the first substantially vertical side, and the second substantially vertical side, the first substantially vertical side being arranged proximate the suction foot, the second substantially vertical side being arranged proximate the supporting foot, the cavity having a substantially rectangular cross-section, the cavity being immovable relative to the upper portion and the lower portion; and an actuator being elongated and having a length in a lengthwise direction, the actuator having a first distal end in the lengthwise direction and a second distal end in the lengthwise direction, the first distal end being arranged inside the cavity and connected to the top side of the lower portion at a first connection location, the first connection location being arranged adjacent the second substantially vertical side and the supporting foot, the second distal end being arranged outside the cavity and connected to the suction foot at a second connection location, the second connection location being arranged adjacent the first substantially vertical side and the suction foot, a majority of the length of the actuator being arranged inside the cavity;

wherein the cavity is configured to allow a hand of a user to manually grip the kitchen device resulting in actuation of the actuator;

wherein the actuator is configured to transfer an actuating force from the user acting on the actuator into a releasing force acting on the suction foot to release the suction foot from the surface.

2. The kitchen device as claimed in claim 1, wherein the suction foot is configured to secure the kitchen device to a substantially horizontal surface.

3. The kitchen device as claimed in claim 1, wherein the actuator and the suction foot are made of a single piece of a same material.

4. The kitchen device as claimed in claim 1, wherein the actuator has a strip shape.

5. The kitchen device as claimed in claim 1, wherein the actuator is reinforced with a durable material.

6. The kitchen device as claimed in claim 1, wherein the second distal end of the actuator is connected to a periphery of the suction foot.

* * * * *